Smith & Priest,
Shearing Machine.

No. 4021. Reissued. June 7. 1870.

Witnesses
W. Casephee
J. H. Caspher

Assignees
John L. Blunt, William Earl
Joseph K. Priest, R. T. Smith
by
Mann, Hewitt & Lawrence.

UNITED STATES PATENT OFFICE.

ROSWELL T. SMITH, WILLIAM EARL, JOSEPH K. PRIEST, AND JOHN G. BLUNT, OF NASHUA, NEW HAMPSHIRE, ASSIGNEES OF R. T. SMITH AND J. K. PRIEST.

IMPROVEMENT IN DEVICES FOR SHEARING AND CLIPPING HORSES AND OTHER ANIMALS.

Specification forming part of Letters Patent No. 72,103, dated December 10, 1867; Reissue No. 4,021, dated June 7, 1870.

*To all whom it may concern:*

Be it known that R. T. SMITH and J. K. PRIEST, of Nashua, in the county of Hillsborough and State of New Hampshire, did invent a new and Improved Device for Shearing or Clipping Wool, Hair, or other Material; and we, JOHN G. BLUNT, WILLIAM EARL, JOSEPH K. PRIEST, and ROSWELL T. SMITH, of the same town, county, and State, do hereby declare that the following is a full, clear, and exact description thereof, reference being had to the accompanying drawings, making part of this specification, in which—

Figure 1:
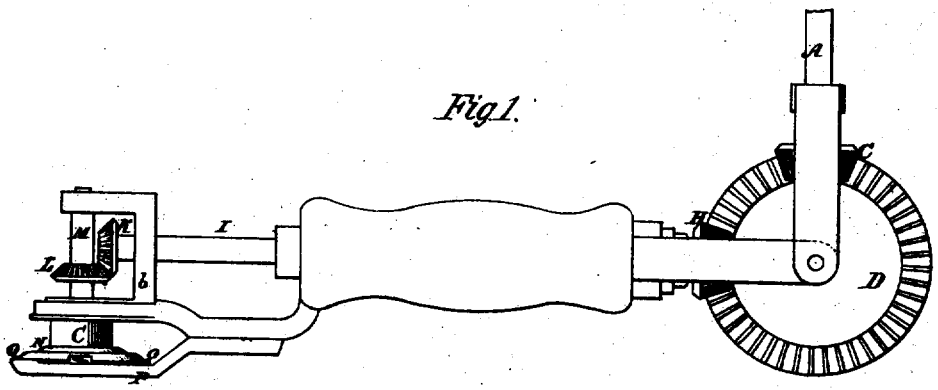
Figure 2:
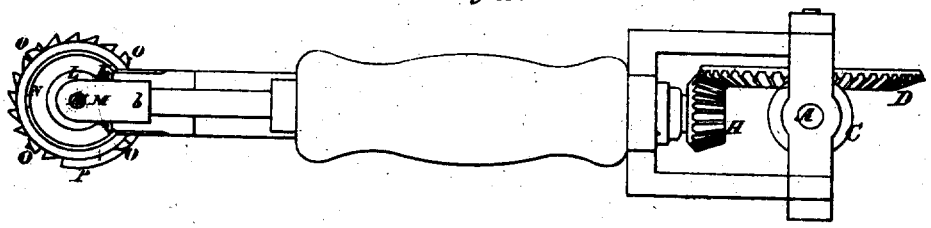
Figure 3:
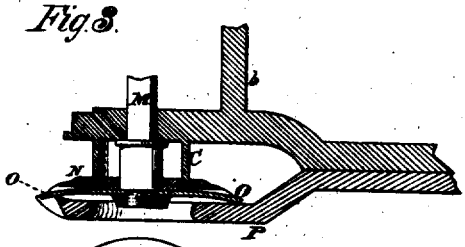
Figure 5:
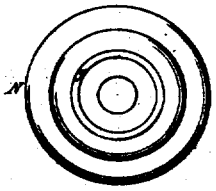
Figure 4:
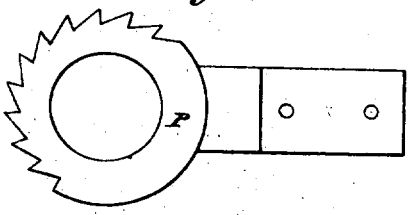
Figure 6:
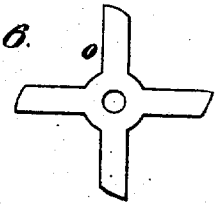

Figure 1 is a plan of the device. Fig. 2 is a horizontal view of the same. Fig. 3 is a section of the cutting part of the machine. Fig. 4 is the cutter-plate. Fig. 5 is the shield covering the cutter or cutters. Fig. 6 is the cutter or cutters.

Similar letters of reference indicate corresponding parts in the several figures.

This invention relates to a device for shearing or clipping wool, hair, or other material for which it may be used.

A is a revolving shaft turning the cog-wheel G, the intermediate wheel D, and, through the cog-wheels H, K, and L, the shafts I and M. The shaft M has its top bearing on the upper part of the Z-shaped arm *b*, and its lower bearing is in the bracket extending from the lower part of said arm *b*. The cutter or cutters O are secured to the lower end of the shaft M, below the bearings on which this shaft turns, and revolve with the shaft. The cutter or cutters O are of spring-steel, and press upon the teeth of the cutter-plate P, with their ends so bent or twisted as to drop between each tooth when revolving over the cutter-plate P, and, when rising over the tooth, to give the peculiar cut of the common scissors. The cutter-plate P is secured to the base of the Z-shaped arm *b* by screws, as is shown by Fig. 4.

The cutters are covered and inclosed by the circular shield N, through which their cutting ends project. The action of the cutters in their relation to the cutter-plate is in no way affected by this shield; it is simply a protection for them. This shield revolves with the cutters, and prevents the material which is being cut from feeding too fast, and from becoming entangled in the cutters.

The cylinder *c*, which extends below the bracket extending from the Z-shaped arm, and is a part of the same, is received into a circular depression or a groove, *g*, in the shield N, Fig. 5, and prevents the wool or other material from reaching shaft M, and winding around it below its lower bearing and above the cutters. A similar result would be obtained if the elevation on either side of the cylinder *c* is omitted. The cog-wheels L and K and shaft M are covered by a bonnet, which is not represented in the drawings. We would remark that the revolving cutters may have one or more cutting ends.

The shaft A is revolved by a device which permits the machine to be moved freely in any direction when running at its greatest speed, which device is not claimed in this application.

To use the machine, it is held in the left hand, in the same position as shown in Fig. 1. With the right hand turn the shaft A, or (which will produce the same results, and is easier) take hold of the intermediate wheel D, and turn it from H toward C. This will move the cutters O over the teeth of the cutter P, and as the edge only of the cutters O presses upon the edge of each tooth of the cutter-plate P as they severally pass each tooth, it will be seen that each motion of a cutter over a tooth of the cutter-plate P is the same as the motion of the common scissors in cutting.

In putting the machine to practical use, after the motive power has been applied, it is held in the right hand, and is moved freely in any direction over the different parts of the animal, bringing the teeth of the cutter-plate P to the wool or hair, which it cuts with great rapidity.

It will be seen, by reference to Figs. 3 and 4, that the cutter-plate P has an opening through it, and that such opening will prevent accumulation of the cut material beneath the plate carrying knives O, as any of the material which might pass beneath the latter plate will readily escape through said opening.

It is seen, from an inspection of the drawings, that the lower cutter-plate is formed with a chamber, so that the points of contact are only between the cutting-blades and teeth, thus allowing a free passage for extraneous matters to pass toward the center of the plate.

Having described the invention, what we claim as new, and desire to secure by Letters Patent, is—

1. Revolving cutter or cutters O, in combination with a cutter-plate, substantially as described.

2. The open cutter-plate P, substantially as described.

3. The shield N, in combination with the cylinder *c*, covering shaft M, substantially as described, and for the purposes set forth.

4. Chambering the lower cutter-plate of a sheep-shearing machine, so that the cutting-blades only have contact with the said plate, and a passage for extraneous matters toward the center of the machine is formed, substantially as described.

JOHN G. BLUNT.
ROSWELL T. SMITH.
WILLIAM EARL.
JOSEPH K. PRIEST.

Witnesses:
J. M. FLANDERS,
M. S. LAWRENSON.